Oct. 9, 1945.  J. R. HOLICER  2,386,554
METHOD AND APPARATUS FOR STORING, ATOMIZING, AND
GENERATING LIQUEFIED PETROLEUM GASES
Filed June 29, 1943  9 Sheets-Sheet 5
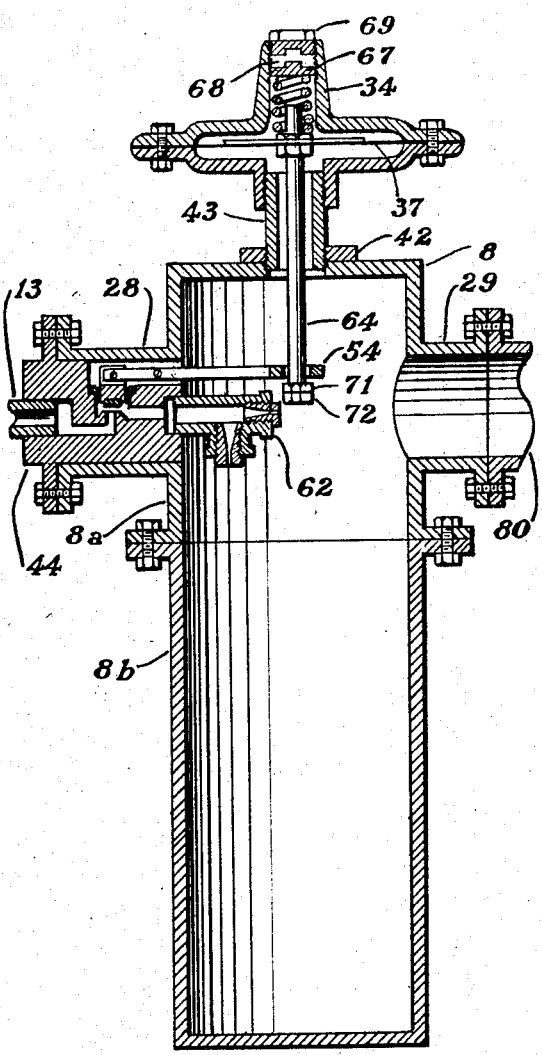
FIG. VII
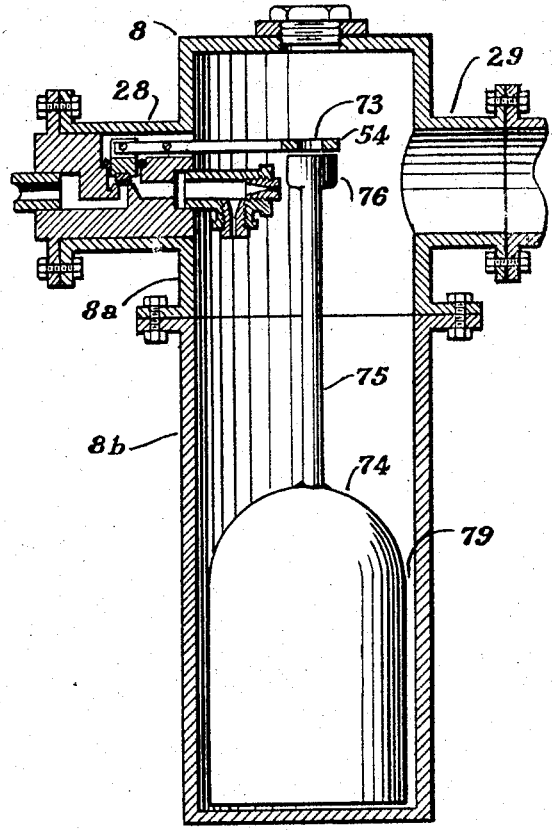
FIG. VIII
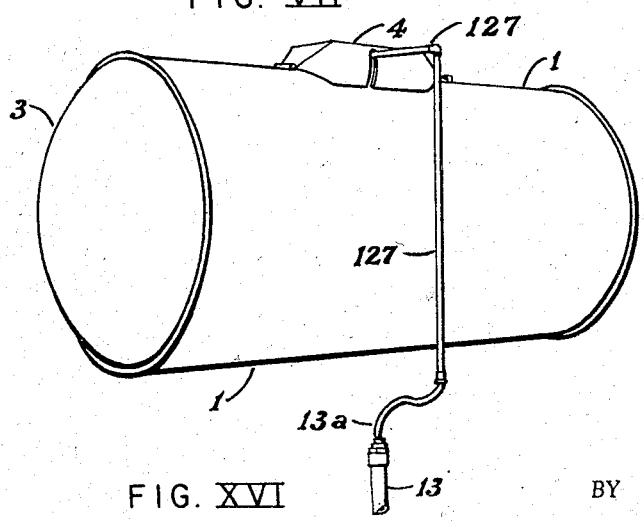
FIG. XVI
John R. Holicer
INVENTOR.
BY *S. Austin Ullie*
ATTORNEY

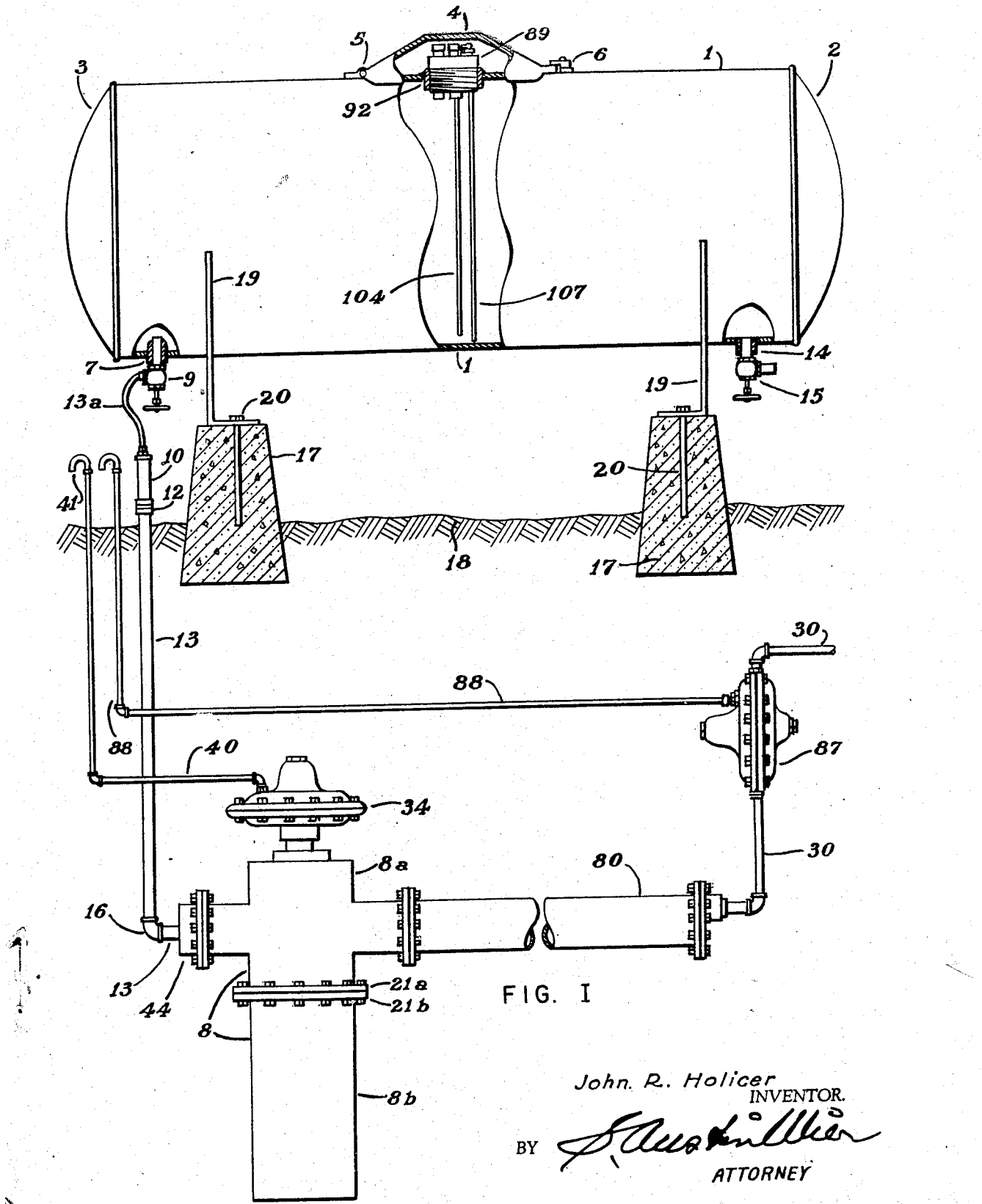
Oct. 9, 1945. J. R. HOLICER 2,386,554
METHOD AND APPARATUS FOR STORING, ATOMIZING, AND
GENERATING LIQUEFIED PETROLEUM GASES
Filed June 29, 1943 9 Sheets-Sheet 1
FIG. I
John R. Holicer
INVENTOR.
BY
ATTORNEY

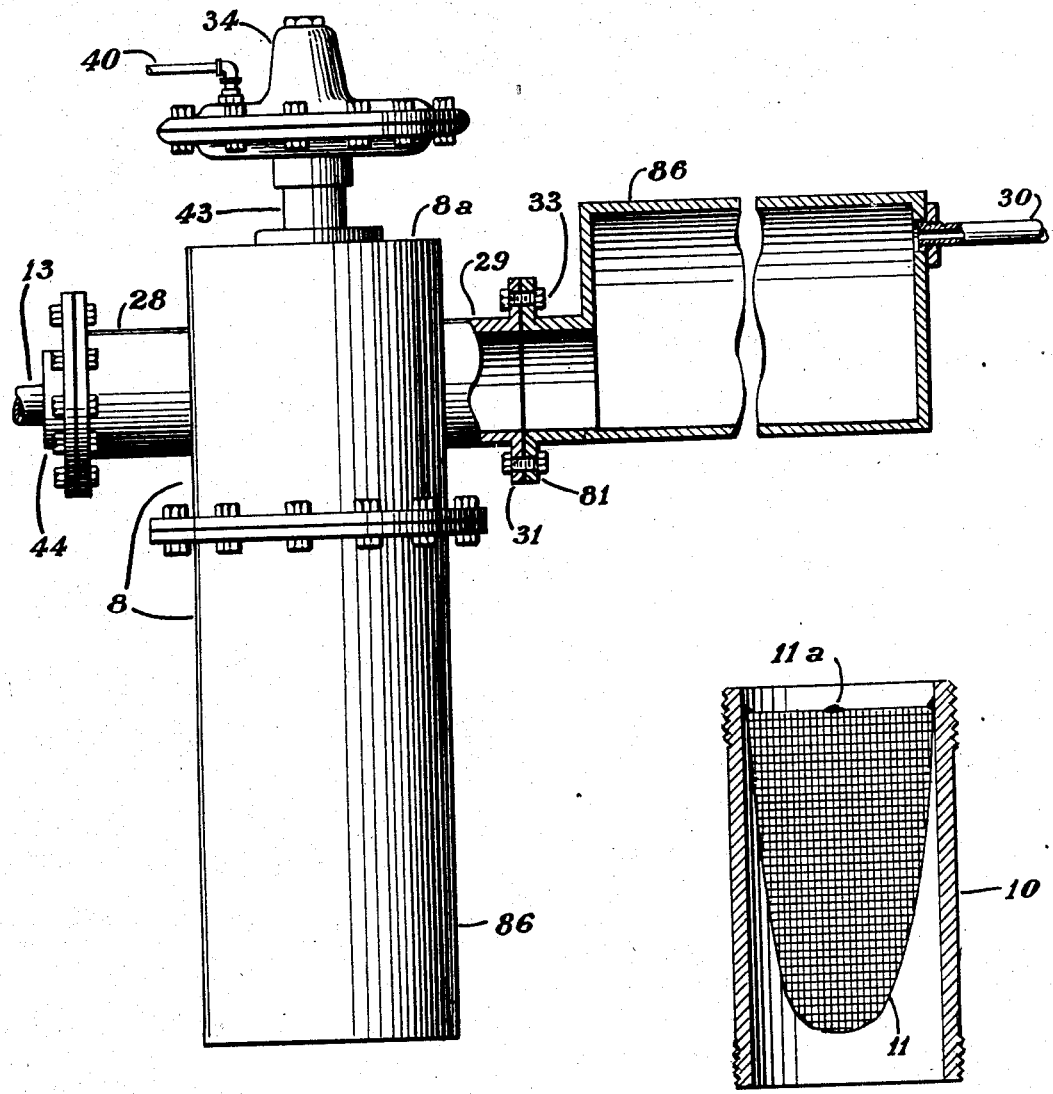

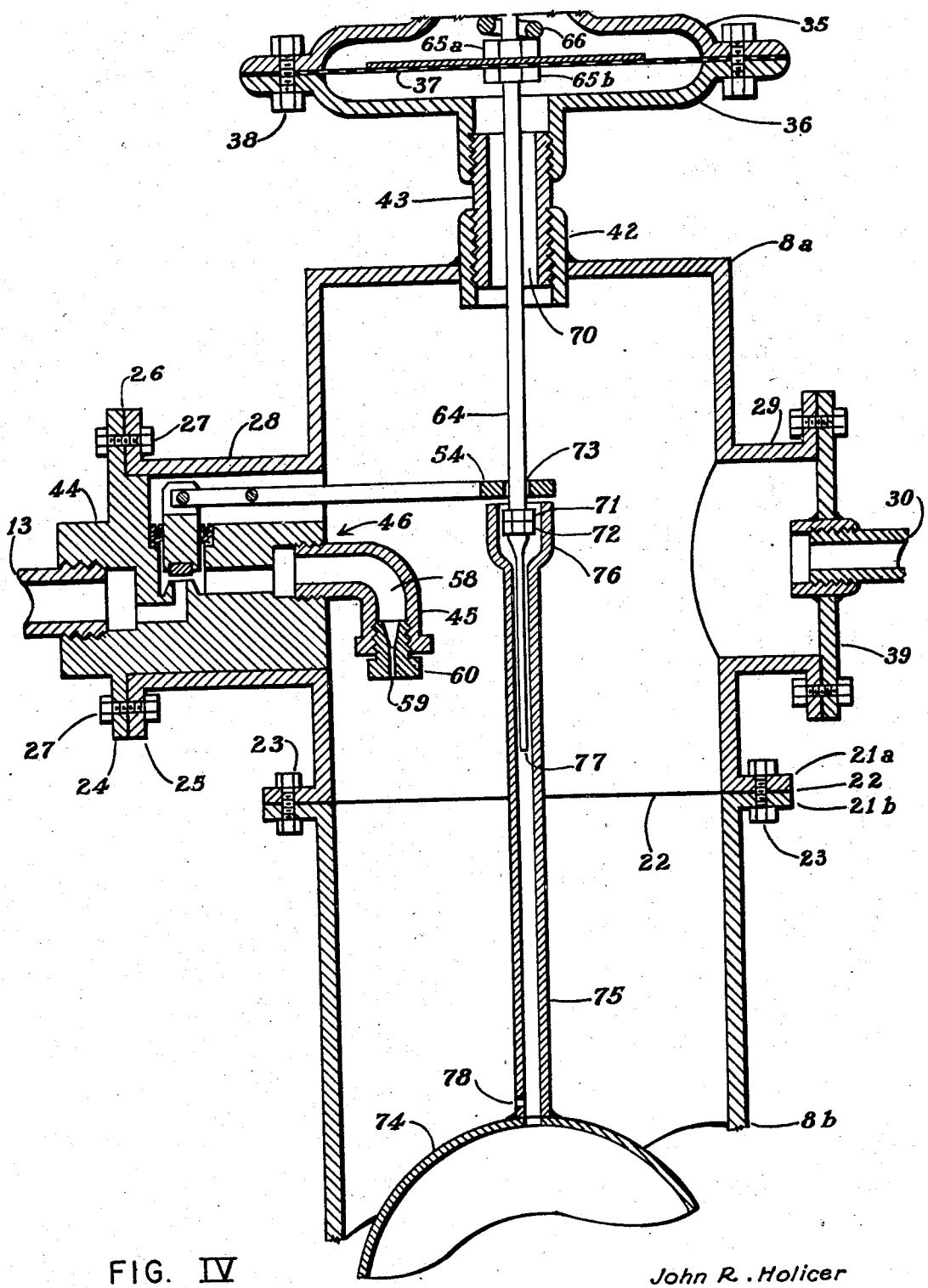
FIG. IV
John R. Holicer
INVENTOR.
BY [signature]
ATTORNEY

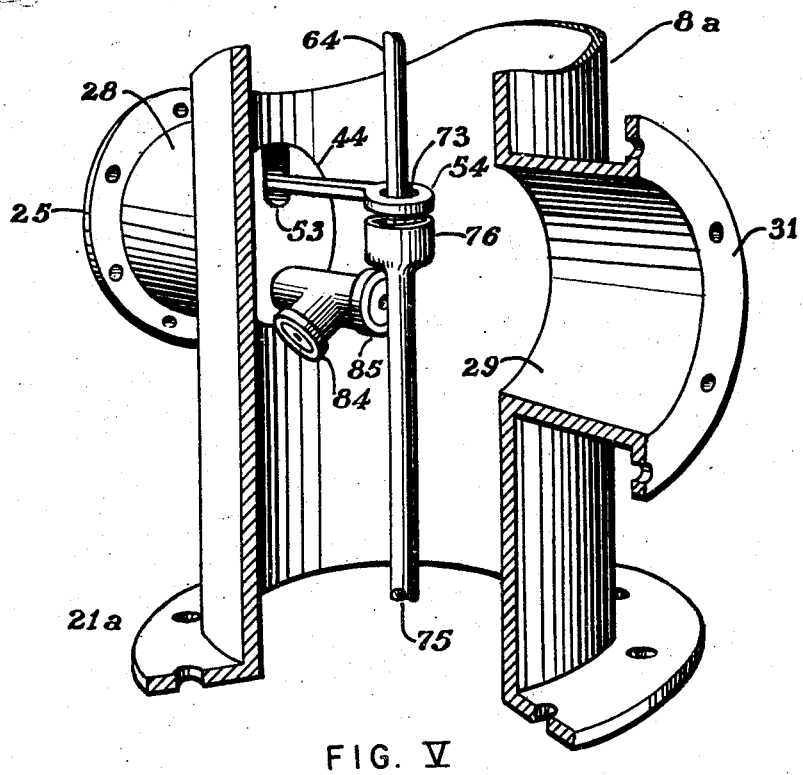
FIG. V
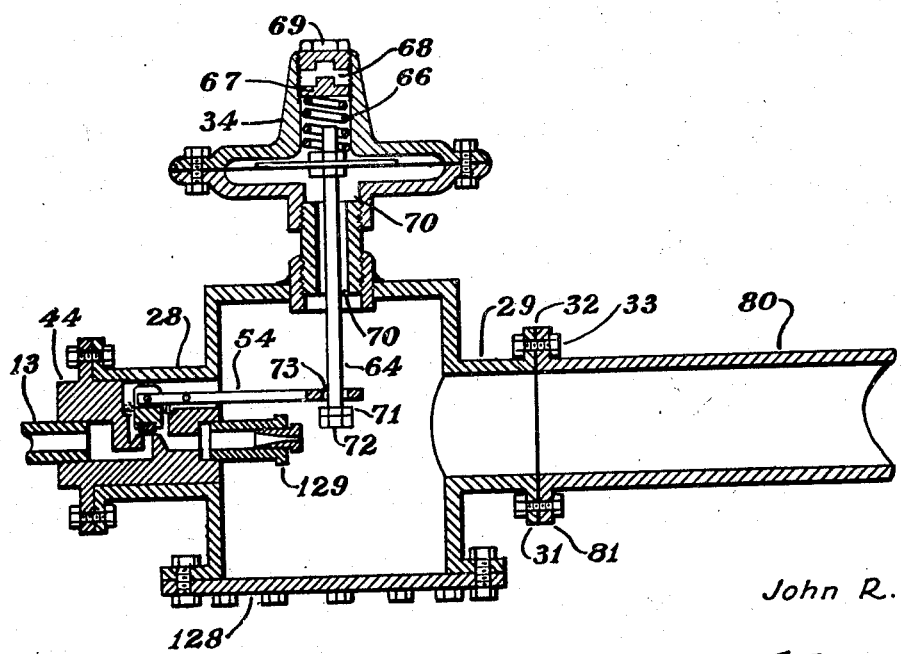
FIG. VI

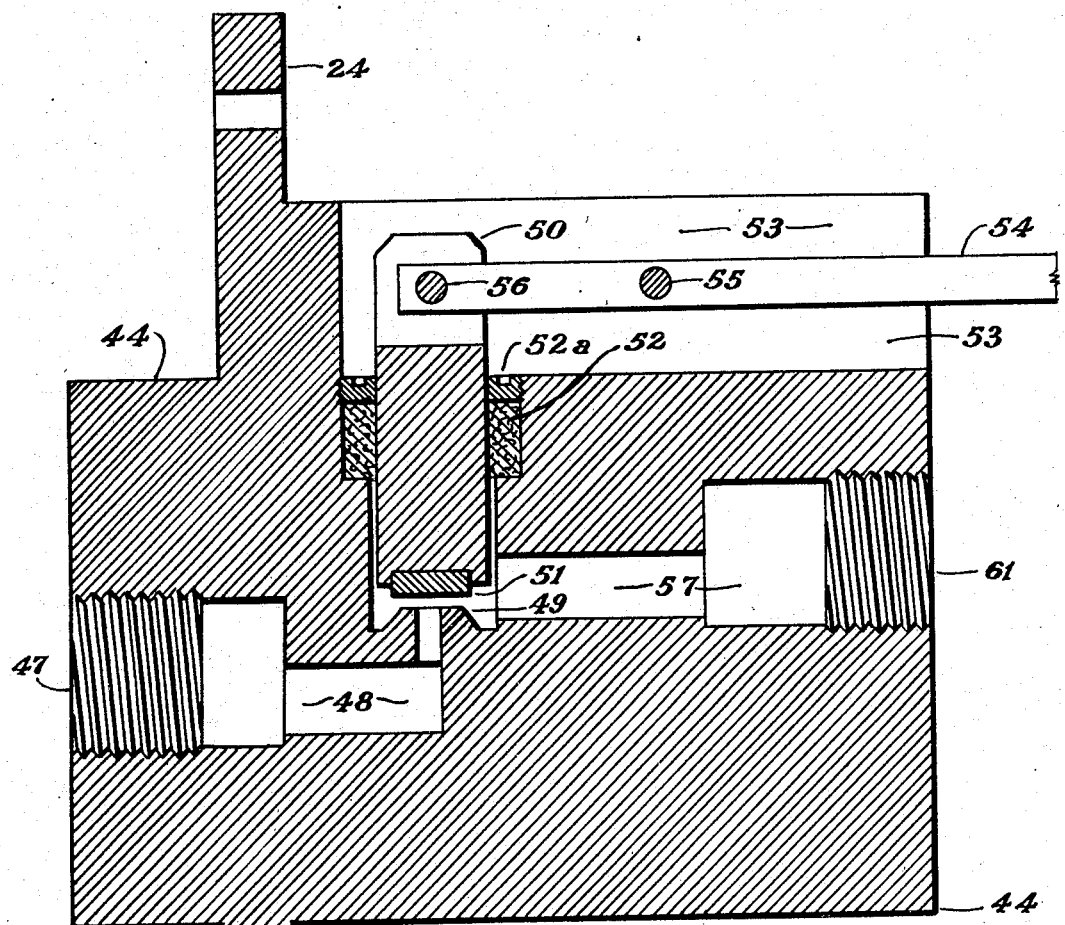
FIG. IX
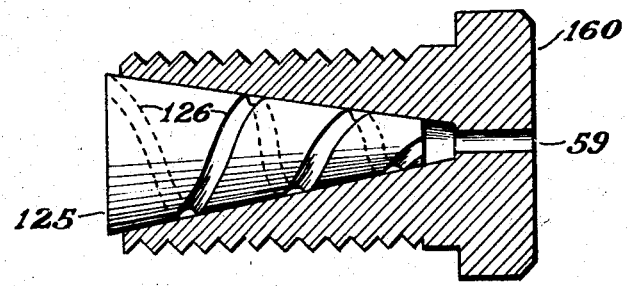
FIG. X
John R. Holicer
INVENTOR.
BY *J. Austin Ulrich*
ATTORNEY Oct. 9, 1945.  J. R. HOLICER  2,386,554
METHOD AND APPARATUS FOR STORING, ATOMIZING, AND
GENERATING LIQUEFIED PETROLEUM GASES
Filed June 29, 1943  9 Sheets-Sheet 7
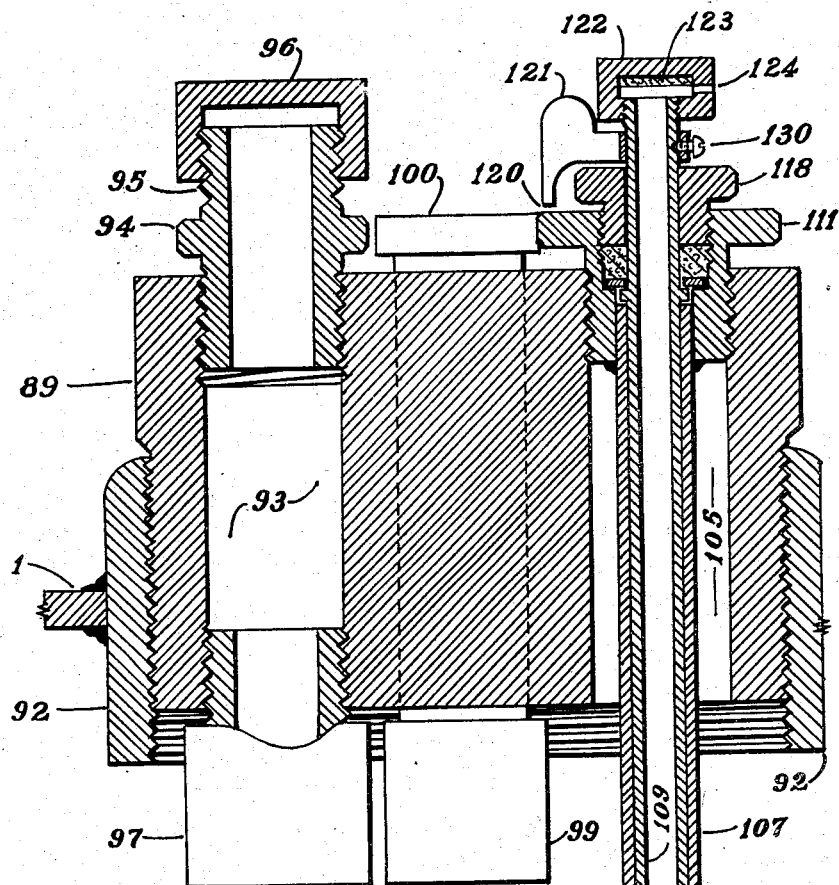
FIG. XII
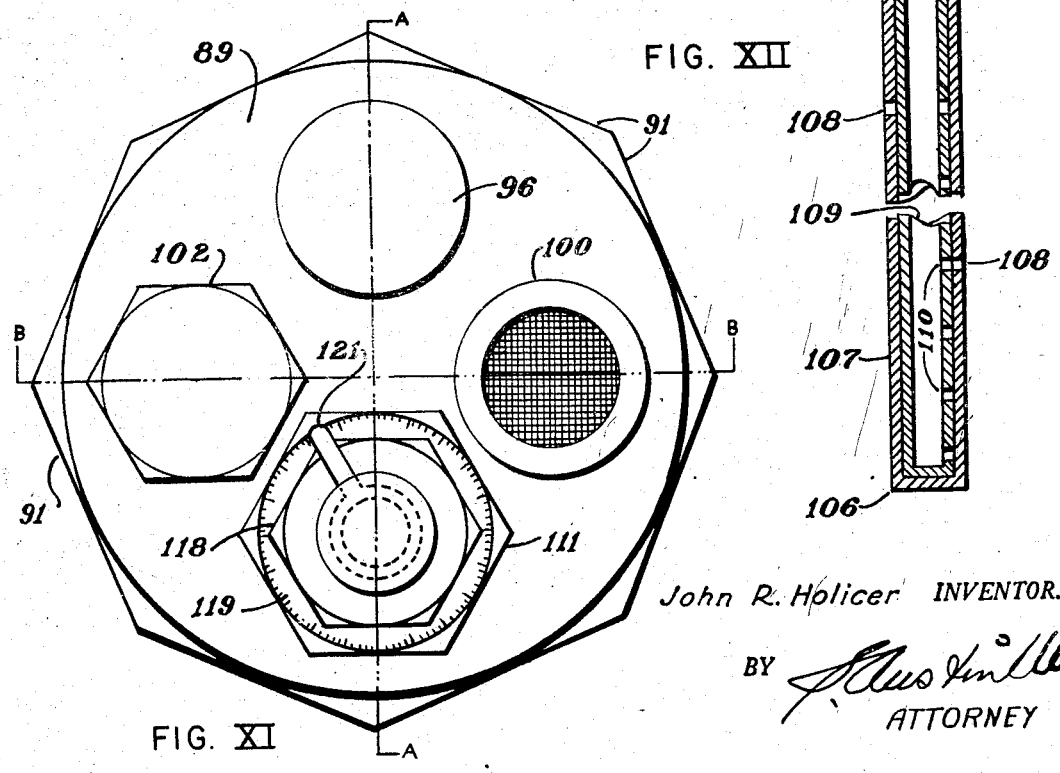
FIG. XI
John R. Holicer INVENTOR.
BY
ATTORNEY Oct. 9, 1945. J. R. HOLICER 2,386,554
METHOD AND APPARATUS FOR STORING, ATOMIZING, AND
GENERATING LIQUEFIED PETROLEUM GASES
Filed June 29, 1943
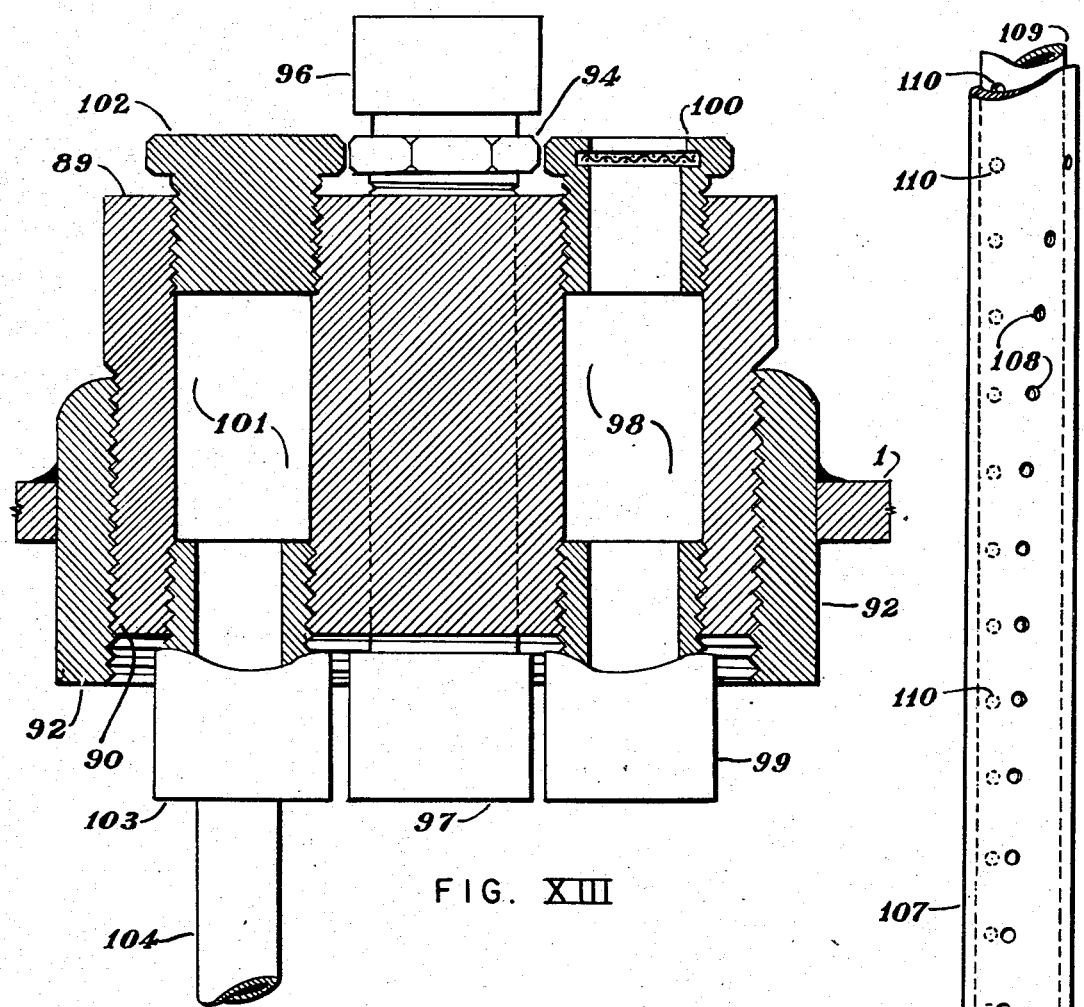
FIG. XIII
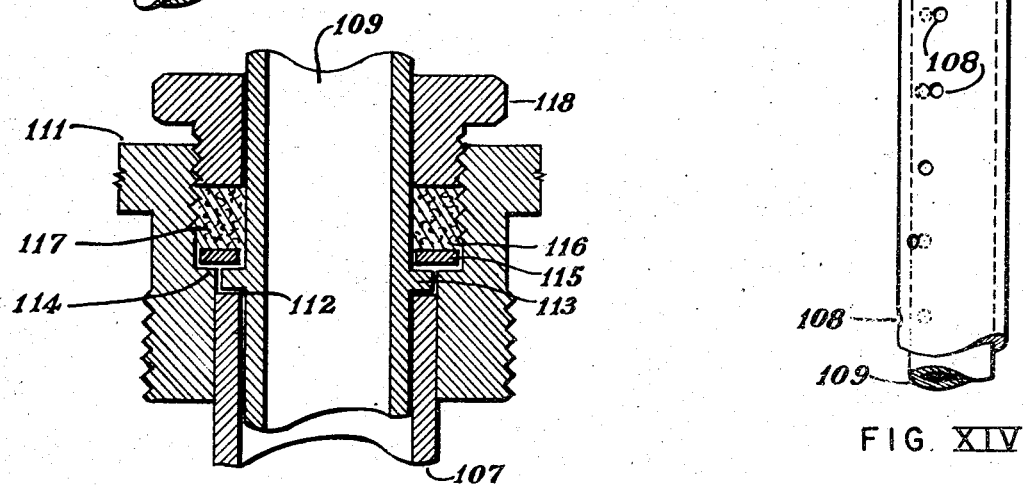
FIG. XV
FIG. XIV
John R. Holicer
INVENTOR.
BY
ATTORNEY

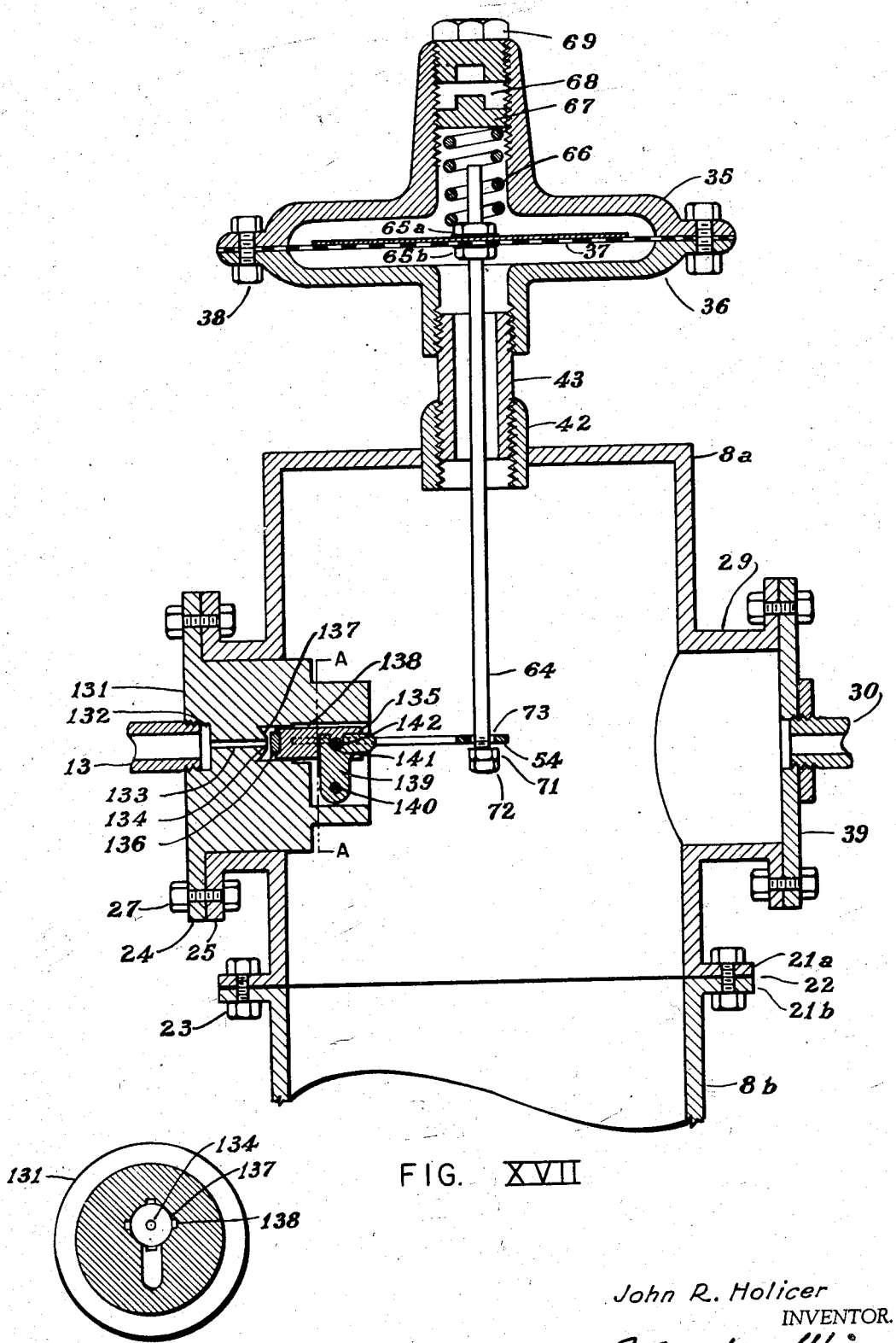

Patented Oct. 9, 1945

2,386,554

UNITED STATES PATENT OFFICE 2,386,554

METHOD AND APPARATUS FOR STORING, ATOMIZING, AND GENERATING LIQUEFIED PETROLEUM GASES

John R. Holicer, Shreveport, La.

Application June 29, 1943, Serial No. 492,738

9 Claims. (Cl. 62—1)

This invention is concerned with method and apparatus for the continuous generation of liquefied petroleum fuel gas into combustible dry gas through the process of mechanically atomizing the liquid into a vapor-like mist and thereafter subjecting it to gentle heat until generated into dry gas.

It is further concerned with the storage of the liquid fuel in one tank and the final generation of the gas within another and smaller chamber buried in the ground and equipped with an expansion valve and an atomizer through which it is supplied with a finely divided spray of fuel to accelerate the gas generation.

Furthermore, this invention, in one of its manifestations, is concerned with the quicker and more voluminous production of the dry gas within a chamber operating at a pressure lower than the normal gas pressure of the fuel.

This application is to be considered in connection with and as an improvement in part of my pending application for patent under Serial No. 402,255. This application has matured into Patent No. 2,373,683. Reference is also made to my Patent No. 2,377,342.

The present invention can perhaps best be understood in contemplation of some of the problems which have arisen in the earlier art, to the solution of which the method and apparatus here offered is addressed.

Problems of the old art

Various have been the methods and devices tried and employed in attempts to efficiently and safely store petroleum fuels and generate them into dry and combustible gas and deliver such gas to the place of consumption; but many problems have arisen in such attempts.

A very early system required the storage of these unstable liquid fuels in a combination storage and generating tank which, in warm climates, sometimes received enough heat from the sun or the atmosphere to convert the most volatile elements of the liquid into gas fuel.

Later such a tank was buried in the ground, and its only source of heat for vaporizing the gas was the heat of the earth. Both systems presented problems.

The problems of the above-ground tank arose because of the extreme variations in atmospheric temperature, with the result that (except in localities where atmospheric temperature is constantly and normally high the year around, such as in Southern California, for instance) the above-ground tank exemplified early in the "bottle gas business" has been generally abandoned, except for the use of extremely light fuels, such as straight propane. This was necessary because where the weather is colder, the demand for fuel increases and the very coldness of the atmosphere inhibits the generation of the liquid fuel into gas, especially that having greater heat content, such as butane and iso-butane.

Some of the problems of the under-ground tank arise from its rapid deterioration, inaccessibility for inspection to determine leaks and the risks of hazard insurance, and inaccessibility for repairs. Such a tank has a useful life only during that period in which its shell is not eaten or rusted away by the chemical action of the earth to the point where it is weakened below a reasonable safety factor. Great numbers of such tanks have given such trouble and will give increasing trouble in the years to come.

A further and very grave problem of the large under-ground storage and generating tank arises from the fact that the liquefied fuels are generated into gas within the storage tank itself; and since all combination storage and generating tanks employ the batch system of generating and delivering gas, there are constant changes in the temperature of the shell of the tank, due to generation of gas and its withdrawal as gas.

This change in temperature is particularly rapid and great when, as in cold weather, considerable fuel demand causes the rapid withdrawal of the generated gases collected in the upper part of the tank; and as these gases are thus rapidly withdrawn, the heat which generated them and which has been absorbed by them is also rapidly withdrawn from the tank.

It is a common thing for heavy frosting to occur on the outside of a batch tank, especially on the under part of the buried tank below the liquid level, because that is the region in which the liquid is demanding and receiving heat from the earth, which heat is quickly carried away with the gases from the upper part of the tank. The result is that this frost and ice-like coating on the outside of the lower part of the tank becomes in effect an insulator which must be overcome and dissipated by further heat from the earth before the full generation of liquid into gas may be resumed.

With a relatively warm upper part and with a cold and frosted under part along a line or level that changes as fuel is withdrawn, there is a considerable expansion and contraction of metal going on. Not only will the joints, whether welded or riveted, be subject to unusual strain, but the very structure of the metal shell itself suffers internal distortion, with the result that its life and usefulness are greatly shortened.

Worse than the effect upon the metal directly resulting from expansion and contraction due to varying temperatures (as above indicated), it has been found that the tank coating, whether of paint, asphaltum or other protective material, is itself distorted and broken; and this allows exposure of the tank and chemical disintegration of the metal as the result of attack by the chemicals in the earth which deteriorate metal. It is well known that many earths abound in strong alkalies, and the surface of the tank becomes pitted and corroded under their reaction. Electrolysis is also a factor in causing disintegration of the tank walls, once they are exposed to unfavorable chemical reaction in the earth.

However, the chief trouble with any batch system, whether the tank is buried in the ground or placed above ground, is to be found in the fact that the more volatile and unstable fuels leave the liquid first and the heaviest liquids are slowest to vaporize. Therefore, the gas consuming appliance is fed with constantly changing fuel, the light and more volatile gases being consumed first and the heavier and more sluggish last; and the heavy fuels have a much higher B. t. u. content than the more volatile fuels. For instance, propane has 2519 B. t. u.'s per cubic foot, and normal butane and iso-butane each have 3274 B. t. u.'s per cubic foot. Mixed fuels are widely used.

Propane, with a boiling point of 48.1° F. below zero, is mixed with normal butane, having a boiling point of 32.9° F. above zero; and to this is added iso-butane which boils at 13.64° F. above zero; and the proportions of the mixture vary in different sections of the country. These gases stay well mixed only in liquid stage. When heated, the liquid yields propane first, iso-butane next, and normal butane last. Thus the batch system runs into trouble.

Very unsatisfactory performance in the batch system generation of dry gases from mixed fuels arises from the fact that after the volatile gases (which produce the greatest pressure) have been withdrawn and consumed, the remaining heavy fuels generate very slowly and the required pressure cannot be maintained, without which a suitable and sufficient supply of generated gas cannot be delivered.

Dangerous expedients have been adopted in an attempt to maintain uniform pressure in the generating tank of the batch system; but all have serious disadvantages and none are satisfactory. Among these are:

Application of heat to the tank, through the use of a gas jet or other flame, or through the agency of an electric heating coil; and these expedients offer chances for dangerous explosions whenever gas leaks appear.

Attempts have been made to circulate hot water in pipes or coils through the batch tank; but of course a leak of such water into the fuel tank may temporarily (or permanently) stop the combustion of generated gas at the burners. The later flow of generated gas through an unlit burner is dangerous to life and property in the extreme.

Conversely, if the gas pressure in the batch tank exceeds the water pressure, then explosive gases would be delivered into the broken water system and be found coming out through plumbing fixtures to explode and burn up the premises.

Any application of additional heat, through whatever means, is a positive and unnecessary expense; because all heat costs money.

The earlier delivered light gases have less B. t. u. content and require less air in combustion; but an adjustment of air at the burner to properly burn such gases will not serve to effect proper combustion of the later heavier gases having greater heat content, because the heavy gases require more air in burning. These changes cannot be made at the burner a few hours apart, especially by the layman consumer. Therefore, the proper mixture never continues available in burning these varying gases arising from mixed fuels in the batch system.

Other problems in the old art have been successfully met by this invention, as will be apparent in the following disclosures.

*Utilizing mixed fuels*

Fuel gases derived from liquefied petroleum gases vary in heat content, pressure and reactions to temperature, and otherwise distinguish themselves in varying physical properties.

Availability of each of these liquefied fuels in various parts of the country is not constant; and other commercial considerations have made the use of mixed fuels widely prevalent.

The mixture is usually of normal butane and propane, and to one or both of these is sometimes added iso-butane. The lower olefin hydrocarbons may be used in the mixture, the commonest being the butylenes; but propylene is occasionally a part of the mixture.

The result of the generation of dry gas from a single storage tank containing a mixture of any of these fuels inevitably leads to the liberation and consumption of the lighter gases first, and to a fuel of constantly changing properties, and to trouble and dissatisfaction.

This invention discloses a method and suitable apparatus for storing, generating and utilizing any of the liquefied petroleum gases mentioned above, and other gases substantially similar in character, especially when mixed together and stored for use. This method and system is specifically offered for the safe and satisfactory handling of mixed fuels.

In this system the use of mixed fuels, such as a combination of propane, iso-butane and normal butane, does not give rise to difficulties such as were every day occurrences in the use of the old batch system of handling mixed fuels, wherein the lighter fuels came off first.

On the other hand, this system positively enjoys an advantage by reason of the use of mixed fuels. The primary advantage is that these mixed fuels are withdrawn in liquid state, at which time they are of homogeneous character; and when they are finally turned into gases, the gas is uniform in character, pressure and heat content; and one unvarying adjustment of the burner to introduce a fixed amount of air for combustion continues at all times to be satisfactory.

However, there is another benefit which in itself offers a considerable advantage, and that is this: Within the liquid fuel storage tank, where the fuels are mixed, there is a constant gas pressure; and this pressure arises out of the temporary and limited expansion into gas of the lightest fuel in the mixture. Of the three fuels named, propane is the lightest, and therefore this gas is largely propane gas, which is very lively and expansive in character; and it generates a good pressure.

This propane gas is never drawn off in gas form and is not consumed; instead, it stands on top of the fuel, exerting pressure thereagainst at all times. Therefore, this system affords a constant and strong gas pressure on the liquid fuel, and this pressure forces it in a strong and uniform flow into and through the expansion valve, and finally through the atomizer nozzle to make a spray. The presence of this constant pressure to always furnish sufficient power to expel the liquid is of great importance.

We must not lose sight of the fact that this system presents a continuous flow system and a continuous generation of gas, as opposed to the batch system. But the gas used in this system is that, and only that, which has been immediately generated by reason of the withdrawal to the burners and the consumption there of fuel as it is needed. In other words, this system generates gas only when, as and if it is needed. Therefore, the gas being made from the thoroughly mixed and uniform homogeneous liquid is in itself constant in character.

Objects of the invention

The method employed in this invention is disclosed throughout this specification; and a vehicle for its employment is disclosed herein and depicted in the drawings.

Such vehicle may be greatly varied in form and arrangement and still employ the method; and this fact becomes obvious when it is understood that the method contemplates the storage of liquefied petroleum gases (and especially a mixture thereof) in a separate and relatively large storage tank that is not designed or operated as a generating tank and which is usually placed above ground for economy, long life and safety.

From the storage tank the fuel is withdrawn in liquid state, usually by gravity and gas pressure, into and through an expansion valve and a mechanical atomizer, which finally divide and break up the liquid into a mist.

The withdrawal by gravity is aided by the gases liberated above the liquid in the storage tank; but these gases are not withdrawn for fuel. Their pressure simply forces the eduction of the liquid.

It must be remembered that the storage tank used in this system absorbs heat from the atmosphere (and if buried in the ground, which is not necessary, it absorbs the earth's heat into this storage tank); but in any event the storage tank absorbs heat into the liquid, and it does not lose this heat by having it carried off with the gas to be consumed. No gas is taken away from this storage tank at all. The tank has stored within the liquid it contains a latent heat sufficient to generate some gas at all times; and it would generate more of the liquid fuel into gas if the vessel were not sealed and under pressure, thus inhibiting full generation of the gas.

Therefore, in this system there is present latent heat in the stored liquid equal to that found in the ordinary batch system of generation; but in this system further heat is taken from the earth after the liquid is atomized into a mist.

In connection with the primary gas generating chamber is located mechanical apparatus of considerable importance:

(a) An expansion valve, which will allow liquid to enter it under pressure and which will discharge such liquid in broken and divided state and in larger volume;

(b) An atomizer nozzle receiving the expanded and partially broken up liquid, passing it through a relatively small orifice, and finally discharging it into the relatively large gas generating chamber as an atomized mist;

(c) An atomizer plug to promote turbulence;

(d) Pressure control mechanism maintaining the mist receiving chamber under relatively low pressure;

(e) Float mechanism limiting the quantity of liquid fuel permitted to accumulate in the chamber.

Thus the combined apparatus of the expansion valve, operating in connection with one or more atomizer nozzles, and the pressure control mechanism and the float control and the turbulence plug, will properly condition the liquid and cause it to be delivered into the gas generating chamber as a very fine and thoroughly atomized mist or spray, enormously increased in volume and under a pressure lower than that carried by the liquid before it enters the expansion valve, and in turbulent condition.

This mist (produced by the expansion valve and the atomizer) is introduced into a relatively small generating chamber buried in the ground; and it is usually introduced in a swirling manner so as to more effectively and immediately dispose the mist particles against the outer shell of the generating chamber, which is relatively warm, as it receives heat from the earth; and this heat is fairly constant, because the earth's temperature does not change much the year round at a point below the frost line.

A lowering of the pressure in the gas generating chamber further facilitates and speeds the process of gas generation.

Liberation of the dry gas fuel from the generating chamber through appropriate control mechanism, including a delivery pipe, a pressure regulator and a cutoff valve, to the burners or appliances where the fuel is utilized brings the method to an end, and results in the furnishing of a dry gas of uniform properties at all times and of sufficient volume and pressure, notwithstanding the relatively small size of the generating chamber under the ground.

The intermediate conditioning of the liquefied fuel by atomizing it prior to its generation into dry gas is of utmost importance in this method.

Considering the foregoing, it is clear then that among the objects of this invention are these:

(a) A continuing gas generating system, as opposed to the batch system.

(b) Uniformity of pressure in the generated gas throughout the entire period of generation and use.

(c) Uniform quality in the gas derived from mixed fuel, and especially uniform heat content.

(d) Withdrawal from the storage tank of fuel in liquid state only, it being then thoroughly uniform in mixture, the last gallon withdrawn possessing the same physical and chemical properties as the first gallon taken.

(e) Absence of disturbance of the fuel in the storage tank. (Quantity generation is not accomplished in the storage tank, and there is therefore none of the agitation ordinarily present in the batch system where the storage tank is also the generating tank.)

(f) Avoidance of variations in temperature in the storage tank and freedom from strains upon the tank and the tank coating ordinarly present in the buried batch tank.

(g) Absence of the need of additional heat such as gas flames, hot water and other expedients which have been employed and found generally unsatisfactory in the batch system.

(h) Mechanical expansion of liquid fuel.

(i) Mechanical atomization of fuel withdrawn from the storage tank, to speed its subsequent vaporization into dry gas, because the atomized fuel absorbs heat more readily.

(j) Deflecting the fuel mist toward the outer shell of the gas generating chamber.

(k) Reduction of the pressure in the generating chamber to make more rapid and complete the generation of dry gas therein.

(l) Prevention of the introduction (by accidental means or otherwise) of any considerable quantity of fuel in liquid state into the gas generating chamber by the use of a float valve or pressure control mechanism.

(m) Utilization of latent heat found in the liquid fuel held in storage, and the addition of further heat from the earth into this fuel after it is atomized and introduced into a vaporizing chamber under ground.

(n) Gas generation equipment fully covered by the earth and not requiring any "hood" over it, thus eliminating any direct contact between it and cold atmosphere.

(o) Liquid eduction from fuel storage by either pressure or gravity, yet utilizing the same equipment.

(p) A single above-ground service head carrying all control equipment which may require manual operation or regular inspection, removably mounted directly within the shell of the storage tank, and from which the vital fittings depend entirely within the storage tank for safety.

(q) All control fittings for the storage tank so disposed within the protection of the tank that were their exposed parts above the tank all broken off, the fuel would continue to be safely contained within the tank and none of it could escape to cause explosions and fires.

(r) A liquid level gauge associated with a storage tank and carried by the service head therein, employing a pair of perforated tubes, one rotatable within the other, and so disposed within the tank that no fuel could escape if the topmost part of the gauge were broken off.

(s) Control mechanism associated with a gas generating chamber and cooperating with a liquid fuel storage tank to allow liquid to flow from the tank intermittently without interfering with the continuous flow of gas from the chamber.

*The drawings*

Numerous arrangements and dispositions can be made of the component parts of this system and still preserve the method here set forth. However, preferred forms of mechanism satisfactory for the practice of this invention are set out in the drawings, in which:

Fig. I is an elevation of an appropriately arranged system, disclosing an above-ground liquid fuel storage tank, partly sectionalized to show fittings, and further disclosing the requisite apparatus below ground.

Fig. II is a sectionalized view of nipple 10, showing the strainer mounted therein.

Fig. III is an elevation of the primary gas generating chamber on which is mounted a controller; and connected to this chamber is shown the large auxiliary generating tank, in section.

Fig. IV is a sectionalized elevation in part of the primary generating chamber, with controller and float installed, and carrying an expansion valve with a single lateral atomizer, all arranged for use without auxiliary generating tank.

Fig. V is a sectionalized view in perspective of a part of the primary generating chamber head, adapted to carry both controller and float, and provided with an atomizer having both lateral and horizontal nozzles.

Fig. VI is a sectionalized elevation of primary generating chamber head alone, carrying a controller and an expansion valve equipped with a single horizontal atomizer nozzle, all arranged to operate in connection with an auxiliary generating tank.

Fig. VII is a sectionalized view of primary generating chamber with controller, but without float.

Fig. VIII is a sectionalized view of primary generating chamber with float, but without controller.

Fig. IX is an enlarged sectionalized elevation of the expansion valve, and a view of the pivoted end of the lever controlling it.

Fig. X is a sectionalized view of an atomizer nozzle carrying a spiral atomizer plug therein, shown in elevation.

Fig. XI is a plan view of the control head for carrying fittings within the storage tank.

Fig. XII is a sectionalized elevation taken along line A—A of Fig. XI.

Fig. XIII is a sectionalized elevation taken along line B—B of Fig. XI.

Fig. XIV is an elevation of the perforated tubes which constitute a part of the liquid level gauge.

Fig. XV is a sectionalized view of a part of the head of the liquid level gauge.

Fig. XVI is a perspective view of storage tank, showing the conduit which may be used to connect the fuel eduction tube carried by the control head with the liquid fuel pipe leading to the primary gas generating chamber.

Fig. XVII shows a variant of the expansion valve operated in connection with the pressure controller, but without an atomizer nozzle.

Fig. XVIII is a sectionalized elevation of the valve body taken along line A—A of Fig. XVII, after the plunger has been removed from the body.

In the drawings the numeral 1 indicates a suitable tank for holding liquefied petroleum gases and like fuels. It may be placed above ground, as shown in the drawings; and this is the preferred position. However, the system will work perfectly if this tank is otherwise positioned, as on the ground, or even buried entirely under the ground. The shape and size of this tank is of no particular moment, except that it be adequate in size and strength to hold a given load of fuel. Because a circular tank, either vertically or horizontally disposed, is usually stronger and easier to make than tanks of some other shape, the circular tank has been indicated, although the other shapes will serve adequately.

When made in cylindrical form and disposed horizontally, the tank is preferably equipped with dished heads 2 and 3. In the top of the tank are mounted certain control fittings carried by service head 89. These fittings are covered for purposes of safety, security and convenience, with a hood 4, which is mounted on top of the tank through the use of a hinge 5, or other suitable fastening devices; and the hood is provided to be locked against prowlers whenever this is deemed necessary. A lock 6 is shown.

A liquid fuel outlet is provided through the bottom of the tank by having welded therein a collar 7 extending into the tank. The collar is provided to extend within the tank a short distance in order to prevent foreign substances and water from being immediately discharged into this outlet which receives the liquid fuel to be conducted later to other fixtures, including an expansion valve 44 and a primary gas generating chamber 8.

Immediately below and screwed to collar 7 is a liquid fuel control valve 9, which in turn leads to a strainer-nipple 10, which carries within it a strainer 11, which may be attached to its nipple housing by being spot-welded or riveted or otherwise affixed in place with fastenings 11—a.

For purposes of convenience in occasionally removing strainer-nipple 10 for cleaning, there is provided in cooperation with it and valve 9 a union 12; and all of these fittings communicate with liquid fuel pipe 13. A short section of this pipe is made of flexible material 13—a to accommodate the expansion in pipe 13.

It is to be noted, however, that eduction of the liquid fuel may be accomplished through the use of a pipe or conduit entering the fuel storage tank at its top or side, provided that the receiving end of this pipe be so disposed as to be kept under and below the level of the liquid in the tank; and the liquid fuel will flow into this pipe when so disposed at all times because of the continuing presence in the pipe of pressure occasioned by the liberation of a relatively small quantity of the liquid into expanded gas within tank 1 which supplies this pipe with liquid fuel. A suitable conduit may be made of pipe 127, provided to connect dip tube 104 with pipe 13.

Liquid fuel may be withdrawn from tank 1 through dip tube 104, which is provided to extend below service head 89, carrying an excess flow check valve 103. In the drawings the outlet for this tube appearing in the top of the service head carries a plug 102; but this plug can be removed and pipe 127 installed to connect with a valve similar to valve 9 and communicating with strainer-nipple 10, all forming a part of the conduit delivering liquid below ground to primary gas generating chamber 8, without using the outlet 7 in the bottom of the tank (which would, of course, be plugged; and plug 102 could be so used).

The dip tube method of liquid eduction is especially desirable where tank 1 is placed flat on the ground or under ground, and where mixed fuel is used.

However, straight butane, with a boiling point of 32.9° F., can be used alone when the storage tank is above ground, and gravity (unaided) will supply sufficient fuel to the gas generating equipment even in the coldest weather.

Because foreign materials and water sometimes collect in storage tanks holding fuel of the character used in this system, it is desirable to provide a clean-out opening in the lowermost part of the tank; and such is indicated by a collar 14 which passes through the bottom of the tank and is welded in place. This collar 14 is to be mounted flush with the bottom of the tank, and does not extend into the tank, because the flush arrangement will facilitate drainage. The end of the tank where the clean-out opening is installed may be made slightly lower than the opposite end thereof to further facilitate drainage; and a clean-out valve 15 is provided to communicate with this outlet. This valve remains closed during normal operations.

When storage tank 1 is mounted above the ground, it may be supported upon brick or concrete piers 17, which extend into the earth; and the earth itself is here indicated as 18.

The piers may carry a suitable cradle 19 having arms or extensions upward to afford a rest for the tank; and these arms may be fastened to the supporting piers by bolts 20.

The liquid fuel pipe 13 may go down into the ground below the tank; and the direction of such line may be changed into a substantially horizontal direction by the use of an elbow 16, so that it may more conveniently connect with primary gas generating chamber 8.

Gas generating chamber 8 is ordinarily constructed of two members, the upper part being head 8—a, which is imposed upon and fastened to well 8—b through the use of flanged members 21—a and 21—b, carrying suitable gasket material 22 therebetween. Bolts 23 hold the flange faces in place; and they may be removed for the purpose of separating vaporizer head from vaporizer well whenever desired. A threaded connection may be provided between this head and the well, if desired, instead of the flanges.

It is possible to dispense with well 8—b when auxiliary generating tank 80 is used, in which case plate 128 replaces this well, and closes the head by being bolted or screwed in place.

The liquid fuel supply line 13 is screwed into valve 44 which is held in place by flange members 24 and 25, carrying gasket material 26 therebetween, and bolted together by the use of bolts 27; or this connection may be made by threads.

Vaporizing chamber head 8—a is provided with an arm 28 carrying valve 44 through which liquid passes, and an arm 29 through which gas is discharged toward pipe 30. The arm 29 is provided with a flange member 31; and a like flange 81 is provided on the auxiliary generating tank. Gasket material 32 is placed between the flanges which are united by bolts 33. Threads may supplant these flanges and bolts.

Pipe 30 carries gas to the place of consumption, and it is provided with pressure regulator 87, and it may carry a cut-off valve also; but the pressure regulator is entirely covered by earth to keep its temperature uniform. It is in no wise exposed to the chilling effects of atmospheric temperature, especially undesirable in the winter time, as is so common in other systems where a covering hood arrangement coming up to the surface of the earth allows cold air to surround it. In the ordinary systems this was considered necessary because the service and control valves, fittings and equipment have been heretofore associated with this regulator under ground, and as these required service and periodic operation, there was no alternative but to furnish them with an open hood which exposed the pressure regulator associated with them. This resulted in occasional freezing and sticking of the regulator and, for the time, prevented the flow of gas therethrough, giving rise to many troubles and annoyances.

In one form of the gas generating chamber 8, it is provided to carry a controller 34, which is formed of top 35 and base 36, each fitted together with flange-like extensions, carrying therebetween a diaphragm 37 forming a partition across the hollow body of controller 34; and this diaphragm is responsive to pressure within gas generating chamber 8. The two members of controller 34 are bolted together with bolts 38.

The resistance of diaphragm 37 is controlled by spring 66 which may be adjusted to allow a predetermined pressure in chamber 8 to operate valve 44. Air relief required by the movement of the diaphragm is provided by vent 40 leading to the atmosphere. Vent 40 extends upwardly to a point above the ground level and is finished with an inverted U-fitting 41 which is turned downwardly to keep out rain and foreign material and which may be provided with a screen to keep out insects.

Controller 34 may be mounted in the very topmost part of chamber 8 by having the collar 42 welded to the latter, carrying a short piece of pipe 43 which communicates with the controller and supports it; or a flange may be used instead of this collar.

In connection with primary gas generating chamber 8, the arm 28 is provided to carry expansion valve 44 and atomizer head 45; and these members may be considered together as comprising the atomizing unit 46.

Expansion valve 44 is of general cylindrical design and preferably made of one block of material which fits into arm 28, where it may be held by threads or flanges. When flanged, this arm is made to provide member 25 which connects with flange 24 on expansion valve 44. Then the entire assembly is held in place in arm 28 by the use of bolts 27. The receiving end of expansion valve 44 is provided with a threaded pipe connection 47 into which may be screwed the delivery end of pipe 13. From this connection there leads away a liquid inlet channel 48 to the valve for the delivery of liquid fuel through valve seat 49. Resting on the valve seat, when the valve is closed, is valve plunger 50 which carries valve disc 51 to provide a resilient but positive closure of the valve.

Around valve plunger 50 is disposed packing material 52, held in place by packing nut 52—a, to prevent the valve from leaking around the plunger. The upper part of valve plunger 50 is mounted within a channel 53; and this channel has the appearance of a U-shaped slot cut into the upper body of the valve; and it communicates with chamber 8. Within this channel is provided a lever 54 mounted on a fulcrum pin 55 and attached loosely to the plunger with pin 56, so that when the free end of lever 54 is moved up or down, the plunger operates to close or open the valve; and this lever 54 may be caused to operate by one or the other of two entirely distinct and separate forces, as hereinafter explained.

There is provided liquid channel 57 to receive liquid which passes through the valve and to deliver it into the atomizing chamber 58; and the latter chamber is considerably larger than the channel through which it is supplied; and it is a great deal larger than the orifice 59 which provides the discharge opening from the atomizer head 45 into chamber 8.

The atomizer head 45 is provided with a removable nozzle 60, so that it may be replaced with another such nozzle having larger or smaller orifice 59. The body of the atomizer head itself is removably threaded into an opening 61 which is provided in the valve body.

It is to be observed that by turning the atomizer head 45 to the right or to the left slightly so that it does not look directly down, there will be produced a swirling effect of the expanding gases flowing through the atomizer; and as they strike the cylindrical walls of chamber 8, they describe a somewhat spiral movement which quickly subjects these gases to the heat of the relatively warm walls of this tank, such heat being provided from the latent heat of the earth present below the frost line.

The atomizer assembly, comprised of head and nozzles, can take various forms. A single nozzle may be used, as shown by numeral 45. However, the atomizer head may be provided with two or more nozzles, each having a suitably sized orifice therein. A variant of this kind, showing two such outlets, one substantially horizontal in direction and the other at a slight angle off of the vertical, is shown in atomizer head 62; and this form is particularly desirable when dry gas is generated both within the primary generating chamber 8 and the auxiliary generating tank 80, whenever the latter is used; and the latter is provided where there is a heavy demand for a large volume of dry and thoroughly gasified fuel. When an unusually large quantity of dry gas is required, an atomizer head with plural outlets is again used; and one such outlet delivers mist directly into a still larger auxiliary generating tank, arranged as shown by numeral 86.

When mist is to be delivered into the auxiliary generating tank, and when well 8—b of the primary generating chamber is not used, a nozzle with one direct outlet is used, as shown by numeral 120.

In operation the expansion valve allows the introduction of liquefied petroleum gases, in liquid form and under pressure, through pipe 13 and through the inlet channel 48. This fuel is still in liquid form as it passes through channel 57; but when it passes into the relatively larger chamber 58, it is somewhat expanded in volume. However, its greatest and most complete and instantaneous expansion is produced by the passage of this fuel out of the rather minute orifice 59 into the relatively enormous chamber 8.

The result of the joint operation of the expansion valve and the atomizer is to produce an enormously expanded gas from a relatively small quantity of liquid. This gas at this stage is made up of an infinite and incalculable number of tiny and mist-like particles which appear to the eye as a gray mist; but in this stage further treatment is required to make of the fuel a true and dry gas; and this is accomplished within the gas generating chamber 8, because this chamber, buried in the earth, receives sufficient heat to immediately translate this atomized fuel into dry gas. This is a distinct and extremely valuable part of this invention; because, were liquid fuel allowed to enter the chamber in quantity, the generation would be slow and relatively little gas of properly dry and combustible character would be delivered therefrom. This chamber is not large enough to generate sufficient gas directly from the liquid fuel without previous atomization or expansion.

However, by expanding and atomizing the liquid fuel and introducing it into the primary chamber in expanded and atomized form, the generation of dry gas within this chamber is quick, and a great quantity of dry and combustible gas flows therefrom, as required.

The generation of dry gas in greater quantity and at greater speed is further promoted by allowing its generation in chamber 8 at a pressure considerably lower than that exerted by the incoming liquid passing through pipe 13. Such liquid is usually under a pressure between 35 and 75 pounds; and chamber 8 is usually operated at 4 to 5 pounds pressure.

The decrease in pressure is provided by a device herein called a controller, 34. As above indicated, this controller is provided with a diaphragm 37 which is responsive to the pressure within the body of chamber 8. Passing through the center of this diaphragm is control rod 64 which is secured to the diaphragm by lock nuts 65—a and 65—b, one above and one below the diaphragm, so that when the diaphragm moves, so moves the rod.

Now the resistance of this diaphragm to pressure is controlled by a spring 66 resting upon the upper lock nut and surrounding the end of rod 64 which is arranged to keep the spring in proper place.

Above the spring 66 is control nut 67, which is threaded in opening 68 provided in the uppermost part 35 of the body of controller 34. The threaded opening carrying this control nut is closed with cap 69. It will be seen then that by removing this cap, the control nut may be so disposed as to increase or decrease the compression on spring 66, and thus increase or decrease the resistance of the diaphragm to pressure.

Below the diaphragm is passage 70 which freely communicates therewith and also with the tank 8. Threads are provided in rod 64 to receive adjusting nut 71, which is kept in place by lock nut 72.

Through the free end of lever 54 there is provided a hole 73 slightly larger than the diameter of control rod 64; and this rod passes through this hole.

Provision is made for the automatic operation of expansion valve 44 by the movement of lever 54; and this lever may be separately and independently operated in automatic fashion by either the controller 34 or the float 74.

It may be operated by excess pressure within chamber 8 which is exerted against diaphragm 37. The upward movement of control rod 64 lifts adjusting nut 71 on the lower end of the rod; and even a slight upward movement of this nut will bring it against the free end of lever 54 which surrounds the rod; and in this way the expansion valve will be closed against any further liquid fuel. This condition of closure will continue until the pressure within the tank is relieved; and such relief follows the further use of gas from the primary generating chamber. But this chamber is always under low pressure. The relatively low pressure maintained in the primary chamber will expedite the generation into gas of any liquid fuel that may have accumulated by condensation or otherwise in this tank.

This system may be operated quite satisfactorily with the use of the controller 34 alone and without the use of the float mechanism, which is capable of separately closing this valve.

Independent means for automatically closing the expansion valve is provided by the float mechanism consisting essentially of a sealed and light weight float 74 normally disposed at the bottom of chamber 8; and this float is capable of being lifted up within the well whenever liquid accumulates in the bottom of the chamber well.

Attached to and vertically disposed above float 74 is float tube 75, securely affixed thereto. The upper end of this tube terminates in float cup 76, which may be made as an enlargement of the lower end tube, so disposed as to surround the lower end of control rod 64 and nuts 71 and 72 attached to such rod, but without touching these elements of the pressure control mechanism.

However, it is well to provide a small extension of control rod 64, which extension is indicated as 77, disposed downwardly within float tube 75 to form a guide therefor in conditioning the upward and downward movement of this tube.

It is to be noted that this float mechanism not only prevents the appearance of any considerable quantity of liquid fuel in chamber 8, but it will positively prevent the filling of this chamber with such liquid and the subsequent flow of the liquid from the chamber through pipe 30 to the burners and other fuel consuming appliances. This is a decidedly advantageous safety measure; and its operation prevents liquid fuel entering the premises served ordinarily with dry gas by this system; and all danger of liquid fuel appearing where it is not desired is eliminated.

However, a vitally important advantage of this arrangement is to prevent the flow of liquid to the burners without in any manner whatsoever cutting off or diminishing the flow of gas to the burners. The burners do not go out and later deliver unburned gas into the premises. In this system gas flows continuously, but liquid does not.

In the event any liquid fuel, by condensation or otherwise, appears accumulated within float tube 75, it finds its way out of drainage hole 78 in the bottom thereof; and it will flow down over the convex surface of float 74 and be promptly dispersed against the warm outer walls of chamber 8 and be generated into gas.

The upper surface of float 74 is substantially spherical in design so that atomized fuel thrown downwardly into chamber 8 through atomizer 45 will not long be contained near the center of the tank, which is not as warm as the side walls thereof. On the other hand, it will move around the spherical surface of float 74 and down its sides, which are in general proximity with the walls of the tank; and such atomized fuel as thus passes downwardly around the float will be forced to pass through the relatively small space 79 between the float and the chamber walls; and this promotes rapid gasification of the fuel.

While this system is ordinarily operated with both the use of controller 34 and float 74, employing the cooperation of control rod 64 with lever 54, and the cooperation of float tube 75 with lever 54, their separate and independent operation, whenever such is found desirable, is here clearly provided for; and the system may be operated with controller alone; and it may be operated with the float alone. When desired, either may be supplied in the structure and the other left out.

Fig. VII shows the operation of expansion valve 44 in connection with chamber 8 when the closure of this valve is effected solely by the operation of the controller 34. Fig. VIII shows the arrangement without the controller, but employing the float 74. Fig. IV shows the usual arrangement employing both the controller and the float. Each have their separate operations and functions to perform and they will automatically effect the safeguards for which they were designed and separately promote the quick generation of the fuel into dry gas.

It has been determined that for all normal needs of the average installation of this system, the relatively small primary gas generating chamber 8 is sufficient; and this is so by reason of the peculiar advantage of the expansion and atomization of the liquid fuel as it is being introduced into this chamber; and ordinarily no other underground generating tank is used or found necessary in this system.

However, so that the production of this system may be standardized, especially as to size, construction details and parts, provision has been made for augmenting the delivery of dry gas where a greater than normal demand is made therefor; and still the standard chamber 8, with its associated mechanism, can be employed in the usual way, by providing an auxiliary gas generating tank 80, or the still larger tank 86.

Any tank of reasonable size and of most any shape and design may be employed as the auxiliary tank, provided it be buried in the earth and be connected to receive its fuel in atomized condition.

Therefore, there has been indicated the standard primary gas generating chamber 8, with its usual complement of fittings, as hereinabove set out in detail, and connected to this chamber is auxiliary gas generating tank 80. When no auxiliary tank is used, plate 39 receives pipe 30; but when installed, tank 80 is connected as follows:

A cylindrical tank of most any length running from a few feet to many feet, is disposed under the earth to be connected to outlet arm 29 through the use of a flange 81 on tank 80, bolted to the flange 31 on arm 29, using bolts and gasket; or it may be secured by threads.

Flange 81 is disposed at the end of arm 29 approximately in line with an atomizer nozzle positioned to discharge its atomized gases in substantially horizontal direction, so that tank 80 may be readily and immediately fed and supplied with such atomized gases.

Flange 81 communicates with the auxiliary tank at its receiving end and on a line with the bottom of the tank; and this position is indicated for the reason that when so disposed, very little, if any, liquid fuel may appear in tank 80 (or tank 86) by reason of condensation of atomized vapors, or otherwise; and the excess fuel in liquid form drains backward through arm 29 down into chamber 8, where, if it appear in any considerable quantity, it will promptly cause the elevation of float 74 and the closure of valve 44.

A small quantity of liquid fuel may occasionally appear as the result of condensation in the auxiliary tank; but because of the construction of this tank, such appearance is limited in quantity and lies in immediate contact with the relatively warm shell of the tank; where it is quickly converted into dry gas as a result of the heat of the earth.

In the use of an auxiliary tank together with primary chamber 8, both of these containers are fed with atomized fuel and both of them readily and quickly and thoroughly convert this fuel into dry gas of proper consistency for complete combustion.

Since this system demontrates that liquefied petroleum fuel gases may be efficiently, readily and almost instantaneously converted into dry gas by having them introduced in atomized state into suitable containers buried in the earth below the frost line, the advantage of the use of an auxiliary tank supplied with atomized fuel becomes apparent. An auxiliary tank may be installed in such length as to meet the demands of the large fuel needs of public buildings, schools, churches, warehouses and offices.

Further flexibility is afforded by reason of the fact that the atomizer may be supplied with nozzles having larger or smaller orifices as needs may dictate. A laterally disposed atomizer nozzle 84 may be provided with a smaller orifice than the atomizer nozzle 85, which is substantially horizontal in disposition, the better to supply the auxiliary tank through arm 29. This particular arrangement is indicated where the auxiliary tank is substantially larger than primary chamber 8.

It has been found that even though atomizer nozzle 85, disposed horizontally, may discharge atomized gas against the outside walls of float tube 75, if the latter be disposed substantially within the median line of the discharge from such nozzle, the arrangement is not disadvantageous, because the vapors divide around and beyond float tube 75 and continue to be discharged through arm 29 in a delivery pattern of somewhat conical shape, increasing in size the further it progresses beyond the point of emission at the orifice; and when so positioned, float tube 75 only serves further to break up and cause the discharge of this atomized gas nearer the side walls of arm 29 and the walls of the auxiliary tank, where they further receive heat from the earth through such walls.

Turbulence in the delivery of atomized fuel into a gas generating chamber, whether into the primary chamber or into the auxiliary chamber, is a positive advantage; and because of this advantage, special provision has been made to increase this turbulence, so that the atomized spray is more readily and quickly thrown against the relatively warm walls of the chamber in which it is generated into dry gas.

To this end a turbulence plug 125 is provided and inserted within the atomizer nozzle so that the stream of atomized fuel does not flow outwardly from the orifice in a straight line but rather will it flow in a whirling and spiral manner. This is accomplished by providing on the outer surface of turbulence plug 125 a spiral groove 126 sufficient in size to carry the quantity of fuel desired, but so disposed as to impart to it the whirling direction desirable to increase turbulence. Fig. X shows a nozzle carrying such a plug.

It is obvious that the length of arm 29 may be, within reasonable limits of manufacture, somewhat extended beyond the relative length appearing in the drawings. In fact, through the use of a suitable connection, such as the flanges shown, the auxiliary tank may become, in effect, simply a long extension of arm 29, as shown in Fig. I. However, the tank may be made larger than arm 29, as appears in Fig. III, wherein the larger tank is designated as 86.

Whether dry gas is to be delivered to the premises where consumed in gas burning appliances directly from the primary gas generating chamber, or from the auxiliary generating tank, a line or conduit of the same character carries this gas. Such a line is indicated by numeral 30; and this line carries and has mounted in it a standard gas pressure regulator 87 which reduces the gas pressure from several pounds to a few ounces, usually about six ounces, this being the best pressure for supplying burners. Such a pressure regulator is well known to the trade and the details thereof are unnecessary. It carries within its body a relief valve with screen and provides connection for a vent tube 88 for venting excess gas pressure to the atmosphere. This tube continues upwardly until above ground and is fitted with an inverted U-shaped outlet also carrying a screen.

For handling the liqued fuel delivered by tank truck to storage tank 1, and for controlling this fuel in storage there is provided a service head 89 carrying the necessary fittings. This head is circular in shape and carries threads 90 on its lower end, while its upper end is provided with shoulders 91 adapted to fit a suitable wrench for installing it and removing it from collar 92 which is welded into an opening in the top of storage tank 1. Incidentally, this opening allows internal inspection of the tank.

Four vertical passages are provided through the head; and each passage is threaded at both the top and bottom ends for carrying fittings, except that passage 105 is threaded only at its top.

Filler passage 93 has mounted in its top the filler connection 94 which carries heavy threads 95 for connecting a hose when the tank is being filled; and a cap 96, with gasket, covers and seals this passage when it is not in use.

The lower end of passage 93 has screwed into it a back pressure check valve 97 which normally remains closed by a spring and by pressure from within the tank, but which opens with the superior pressure of liquid fuel being delivered into the tank.

Safety relief passage 98 is fitted with a spring controlled safety relief valve 99 at its lower end, set to relieve excess pressure within tank 1; and the upper end of this passage has screwed into it screened bushing 100 to keep out foreign materials.

Fuel withdrawal passage 101 is ordinarily plugged at its upper end with plug 102, because the use of this passage for withdrawing liquid fuel is optional and not employed unless the tank is placed on or under ground (in which case collar 7 is plugged instead, along with collar 14).

When passage 101 is used, plug 102 is removed, and a valve similar to valve 9 is arranged to communicate with dip tube 104 through the use of pipe 127 and to further communicate with pipe 13.

The lower end of passage 101 has screwed therein a spring controlled excess flow check valve 103, which immediately closes against the further discharge of liquid if there occurs a break in line 13 or any of its fittings.

Depending below valve 103 is a dip tube 104 extending to near the bottom of the tank to pick up liquid fuel when passage 101 is opened.

Gauge passage 105 carries a combination liquid level gauge and ten per cent outage gauge assembly 106.

This gauge assembly determines the level of the liquid in tank 1; and indicates the filling of the tank up to ninety per cent of its capacity, it not being desirable to fill the tank more than that amount. The upper ten per cent space is left for the accumulation of gas and as a safety measure.

Outer tube 107 is provided with a series of spaced and graduated holes 108 spirally disposed around its wall and adapted to successively register with a series of holes 110 vertically disposed in a straight line along the side wall of inner tube 109. Such registration occurs whenever tube 109 is rotated within tube 107. Registration of the holes may occur at only one place at a time to form an opening communicating with the storage tank; and through this opening liquid will flow upwardly through tube 109 only when liquid is at the level of the holes then registering. Thus the level of the liquid is disclosed. Both tubes are sealed at their bottom ends and they fit together closely.

The upper end of tube 107 is firmly fitted into adapter 111 by welding or through the use of threads. This adapter is provided with a shoulder 112 around the opening inside it; and immediately above this shoulder and resting thereon is a ring 113 which is firmly affixed, by welding or other attachment, to the outer side walls of inner tube 109, so that this inner tube may not pass downwardly below the point at which it is held by this ring upon this shoulder.

A further and larger shoulder 114 is also provided in adapter 111 on which rests a free ring 115, which ring is not attached to anything but merely rests on this second shoulder and above the fixed ring 113, so that when free ring 115 remains in place, tube 109 may not move upwardly; but the space between this free ring and the first shoulder 112 affords snug but nevertheless sufficient room in which this fixed ring 113 may be rotated, along with the tube to which it is attached. The net result of this arrangement is that the tube may be rotated, but it may not be moved up or down, while the system is in ordinary operation.

Above the free ring 115 is packing space 116 filled with suitable packing material 117, which material may be compressed to firmly fill the entire packing space, and especially press against the side walls thereof to prevent any fuel, whether liquid or gas, from passing out therethrough.

Now, this packing material is held in place and may be subjected to further compression by a threaded packing nut 118 which is carried in the uppermost part of the adapter 111 to compress and control the packing and to keep the free ring in its proper place.

Disposed around the outer edge of the top side of the adapter 111 is a series of figures or other suitable indications which will disclose the relative positions of the two tubes whenever they come to rest after any particular rotation or partial rotation; and thereby may be observed the quantum of liquid fuel in storage tank 1. For each spirally placed hole in the outer tube, which may register with its companion hole in the other tube, there is a separate indication on this indicator face 119.

Above the indicator face and pointing to it is pointer 120 which is firmly affixed to the upper extension of inner tube 109 by the use of set screw 130, so that the pointer moves when the tube is rotated and it will indicate the relative positions of the two tubes. In fact, this pointer also has a short strong extension thereof constituting a handle 121 for moving the tube and pointer around.

On the extreme upper end of inner tube 109 is a cap 122 which, when screwed down firmly, closes and keeps the tube sealed, especially by reason of gasket 123 carried within this cap.

However, by reason of the threaded relation between this cap and the end of the tube it carries, the cap can be unscrewed part way without entirely removing it, and when so elevated, it exposes the contents of the tube to the indicator hole 124, which passes through the side wall of the cap. Whenever this indicator hole is opened, there will be forced out of it a small quantity of the contents of the inner tube, whether gas or liquid; and in this way may be observed the level at which liquid ceases to flow through the inner tube and out of the indicator hole, and where gas begins. Wherever this transition occurs is shown the liquid level within storage tank 1.

The above fittings carried by service head 89 constitute the usual complement of valves and fittings required on the tank for the operation of this system; and one arrangement and advantage of having all of these fittings carried by this head is that they may be made up, tested, adjusted and inspected at the factory to determine that they are in perfect working order; and thereafter, when completely assembled in the head, the entire assemblage may be screwed into the collar 92 with one simple operation, after which the fitting of the tank is completed.

An unusual and important advantage of the service head here disclosed is that it offers a valuable safety feature, in that all of the service head fittings which could be broken off and thereby allow the escape of explosive fuel are placed below and depend from the under side of the head; and they are positioned entirely within the tank itself, where they are completely protected.

For instance, if through accident every extension above the top of the head were broken off, there would be no escape of either gas or liquid fuel. This is thought to be the only system employing such remarkably safe construction and arrangement of these necessary control fittings.

Also important is the fact that by reason of the design, construction and disposition of the service head and its complement of fittings, it is entirely possible to dispense altogether with all openings in the tank except the one carrying this head; and particularly is it possible to dispense with the openings represented by collars 7 and 14 on the under side of the tank, in which case passage 101 is put into use for delivering liquid fuel from the storage tank.

The back pressure check valve 97, the safety relief valve 99, and the excess flow check valve 103, depending below service head 89, may be constructed substantially in accordance with the disclosure of applicant's prior Patent No. 2,188,597.

An expansion valve 131 may be used in this system in place of the standard expansion valve 44. Either expansion valve may be used without an atomizer nozzle. In such case, however, it is especially desirable that the primary generating chamber 8 be provided with controller 34 so that the pressure in this chamber may be kept normally low, the better to allow for complete expansion of the mist entering from the valve.

The details of this optional valve 131 are indicated in the drawings, wherein the body of the valve 132 provides liquid inlet channel 133 ending in valve seat 134 which is closed by plunger 135, fitted with seat material 136. The plunger is mounted in cylindrical opening 137 having around the walls thereof a plurality of mist passages 138 through which mist is discharged into the low pressure chamber 8.

Lever 139 is mounted on fulcrum pin 140, which is carried by the body of the valve; and the connection between this lever and the plunger is provided by pin 141 which engages notch 142. The free end of the lever has a hole 73 therein so that control rod 64 may cooperate with the lever in the usual way. The elevation of diaphragm 37 causes the upward movement of control rod 64 to lift nut 71 against the free end of the lever and thereby close the valve.

Method and operation

The operation of the mechanism disclosed as an example of suitable apparatus for practicing this method has been indicated throughout the specification; and it is thought now to be apparent.

The method may be practiced with the disclosed apparatus, or with substantially equivalent equipment; but the method may be practiced with mechanism varying considerably from that illustrated herein.

The essence of the method is to be found in the successive steps of storing liquefied petroleum gas in a pressure vessel under conditions that permit the absorption into the fuel of heat from the surrounding atmosphere or earth, the atomization of the liquid fuel withdrawn from storage, and its introduction into a primary gas generating chamber buried in the earth where it may further absorb heat sufficient to generate the fuel into dry gas; and it is desirable that a further step be taken to hasten the process by operating the primary generating chamber under a pressure lower than the normal pressure of the liquefied gas in the storage tank.

Safety in the practice of the method is furthered by the use of a specially equipped control head in the storage tank for handling the liquid fuel in a manner that will prevent fires and explosions in the event of the accidental breakage of the exposed members and parts of the head; and greater safety is provided in the handling of the generated gas by employing automatic means which prevent the delivery of liquid fuel into the dry gas conductor leading to the consuming appliances.

The method, while substantially as stated, is more fully indicated by saying that: Liquefied petroleum gas fuel, such as butane, propane, or the like, or a mixture of such fuel, in liquid form, is stored in a closed tank wherein it absorbs heat from the atmosphere or from the surrounding earth; and thus charged with a latent heat, this fuel is educted from storage in liquid state by the pressure of gas liberated within the storage tank; and the discharge may be further aided by gravity.

The liquid fuel is then forced through an expansion valve, by which operation it is increased in volume and reduced in pressure. It is then immediately supplied to the primary gas generating chamber without further conditioning.

However, there is an increase in expansion by causing the delivery of the expanded fuel from the valve through a small opening and into a large chamber to more thoroughly atomize it. Within the primary generating chamber buried in the earth further and sufficient heat is absorbed by the atomized fuel to cause its immediate translation into dry gas. The delivery of the fuel mist into the chamber in a state of turbulence speeds the process of generation.

Generation is quickened and the volume of dry gas is increased by operating the chamber under relatively low pressure; and it is desirable that liquid fuel be prevented from accumulating in the generating chamber and from passing to the service conduit feeding dry gas to the burners.

In the practice of the method fuel may be temporarily prevented by automatic means from entering the generating chamber; and this is accomplished without any interference whatever with the continuous flow of dry gas from the chamber to the burners. The method therefore contemplates the intermittent introduction into the generating chamber of a sufficient amount of atomized fuel to furnish the required volume of dry gas continuously flowing to the burners.

I claim:

1. The method of producing gas fuel from liquefied petroleum gas stored in liquid form in a closed vessel, by causing its eduction therefrom in liquid form through the use of its own gas pressure; atomizing the liquid; introducing it in a state of turbulence into a relatively dry chamber buried in the earth; obtaining sufficient heat therefrom to convert all of the introduced fuel into vapor; maintaining low pressure in the chamber; and withdrawing gas from the chamber for consumption as needed, while balancing the rate of introduction of fuel into the chamber with the rate of withdrawal of fuel therefrom to substantially maintain the vaporized fuel in such state.

2. The method of preparing gas fuel from liquefied petroleum gas stored in a pressure vessel, said method comprising the removal therefrom of liquid fuel as needed; the passage of such liquid through an expansion valve to increase its volume and lessen its pressure; the delivery of expanded fuel into a chamber buried in the earth; the withdrawal of gas from such chamber; and the correlating of the introduction of fuel into the chamber and the withdrawal of fuel therefrom so as to cause substantially all of the fuel so introduced to flash into vapor and remain in such form while in the chamber and maintain the chamber substantially free from liquid.

3. The method of treating liquefied petroleum gas stored in a tank, comprising withdrawing it therefrom in increments, atomizing the withdrawn increments, injecting the atomized mist as made into a chamber buried in the earth, deflecting the mist as injected toward the outer walls of the chamber, exposing the deflected mist to the heat of the earth until converted into gas, and withdrawing the gas for consumption.

4. The method of satisfying the demand of fuel consuming means for gaseous hydrocarbon fuel, which consists of withdrawing such fuel in liquid form from a source of supply at the rate the fuel is consumed, reducing the withdrawn liquid to a mist, converting such mist to a gas vapor by expansion in a zone obtaining sufficient heat from the earth alone to maintain the vapor in such state and in a quantity equal to the rate of fuel consumption, then conducting the fuel to the consuming means.

5. In a gas generating system, a chamber buried in the earth; a conduit adapted to convey liquid fuel; an expansion valve communicating with the conduit and the chamber and adapted to expand the liquid into a mist and deliver the mist into the chamber; and float means constructed to close the valve whenever a small quantity of liquid collects in the chamber.

6. In a gas generating system, a tank for storing liquefied petroleum gas; a conduit leading therefrom; an expansion valve arranged to receive liquid fuel from the conduit; a vaporizing chamber buried in the earth, said expansion valve being located within said vaporizing chamber and arranged to discharge fuel into the interior thereof; pressure operated diaphragm means for opening and closing the valve; and conduit means for removing gas from said chamber.

7. In a system for generating gas from liquefied petroleum gas, a storage tank; a chamber buried in the earth; a pipe connecting the tank with the chamber; an expansion valve communicating with the pipe and the chamber; atomizing means associated with the valve and the chamber adapted to deliver atomized fuel into the latter; and float operated means for actuating the valve to limit the flow of liquid into the chamber.

8. In a gas generating system, a storage tank above the earth, a primary gas generating chamber buried in the earth; an atomizer between the tank and chamber and communicating with both and arranged to receive liquid from the tank and discharge it in the form of mist into the chamber; an auxiliary gas generating chamber communicating with the primary chamber; and automatic means for maintaining both chambers under a pressure lower than that of the tank.

9. In a device for converting liquid fuel into gas, a gas generating chamber adapted to be buried in the earth; an expansion valve carried by such chamber; an atomizer arranged to receive expanded fuel from the valve and deliver atomized mist into the chamber; control structure including means within the chamber for closing the valve when liquid fuel accumulates in the chamber in a small quantity.

JOHN R. HOLICER.